(12) United States Patent
Rovang

(10) Patent No.: US 8,539,435 B1
(45) Date of Patent: *Sep. 17, 2013

(54) METHOD AND SYSTEM FOR REMOTE SOFTWARE TESTING

(75) Inventor: Gene Rovang, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 97 days.

This patent is subject to a terminal disclaimer.

(21) Appl. No.: 13/079,141

(22) Filed: Apr. 4, 2011

Related U.S. Application Data

(63) Continuation of application No. 12/470,854, filed on May 22, 2009, now Pat. No. 7,945,899, which is a continuation of application No. 10/462,509, filed on Jun. 16, 2003, now Pat. No. 7,546,584.

(51) Int. Cl.
*G06F 9/44* (2006.01)

(52) U.S. Cl.
USPC ............. 717/100; 717/125; 717/126; 714/38; 714/46

(58) Field of Classification Search
USPC ............................ 717/125, 126; 714/38, 46
See application file for complete search history.

(56) References Cited

U.S. PATENT DOCUMENTS

| | | | |
|---|---|---|---|
| 4,589,068 A | 5/1986 | Heinen, Jr. | |
| 4,979,074 A | 12/1990 | Morley et al. | |
| 5,228,039 A | 7/1993 | Knoke et al. | |
| 5,379,409 A * | 1/1995 | Ishikawa | 714/37 |
| 5,388,252 A | 2/1995 | Dreste et al. | |
| 5,455,933 A | 10/1995 | Schieve et al. | |
| 5,491,743 A | 2/1996 | Shiio et al. | |
| 5,615,331 A | 3/1997 | Toorians et al. | |
| 5,625,410 A | 4/1997 | Washino et al. | |
| 5,630,049 A | 5/1997 | Cardoza et al. | |
| 5,732,212 A | 3/1998 | Perholtz et al. | |
| 5,777,874 A | 7/1998 | Flood et al. | |
| 5,815,653 A | 9/1998 | You et al. | |
| 5,819,093 A | 10/1998 | Davidson et al. | |
| 5,850,562 A | 12/1998 | Crump et al. | |
| 5,878,158 A | 3/1999 | Ferris et al. | |
| 5,953,451 A | 9/1999 | Syeda-Mahmood | |
| 5,990,852 A | 11/1999 | Szamrej | |

(Continued)

OTHER PUBLICATIONS

U.S. Official Action dated Jul. 20, 2012 in U.S. Appl. No. 13/183,076 entitled "System and Method for Debugging a Target Computer Using SMBUS", First Named Inventor: Righi.

(Continued)

*Primary Examiner* — Phillip H Nguyen
(74) *Attorney, Agent, or Firm* — Hope Baldauff, LLC

(57) ABSTRACT

Systems and methods for testing a computer program executing on a remote computer physically distant from a local computer are provided. The remote computer includes a redirection device operative to transmit the video output of the remote computer to the local computer via a network connection. The redirection device may also receive user input commands generated at the local computer and provide the input commands to the remote computer as if the input commands were physically generated by a user at the remote computer. The remote computer also includes a software program to be tested. The local computer includes a remote control software application operative to receive and display the video output transmitted from the remote computer. The remote control application also receives user input commands generated at the local computer by an automated testing application and transmits the commands to the redirection device.

20 Claims, 5 Drawing Sheets

(56) References Cited

U.S. PATENT DOCUMENTS

| | | |
|---|---|---|
| 5,991,546 A | 11/1999 | Chan et al. |
| 6,011,920 A | 1/2000 | Edwards et al. |
| 6,035,059 A | 3/2000 | Kurosawa et al. |
| 6,054,676 A | 4/2000 | Wall et al. |
| 6,055,334 A | 4/2000 | Kato |
| 6,065,072 A | 5/2000 | Flath |
| 6,067,407 A | 5/2000 | Wadsworth et al. |
| 6,115,645 A | 9/2000 | Berar |
| 6,119,247 A | 9/2000 | House et al. |
| 6,124,811 A | 9/2000 | Acharya et al. |
| 6,137,455 A | 10/2000 | Duo |
| 6,145,088 A | 11/2000 | Stevens |
| 6,170,021 B1 | 1/2001 | Graf |
| 6,202,070 B1 | 3/2001 | Nguyen et al. |
| 6,209,023 B1 | 3/2001 | Dimitroff et al. |
| 6,219,695 B1 | 4/2001 | Guttag et al. |
| 6,236,884 B1 | 5/2001 | Hunter et al. |
| 6,243,743 B1 | 6/2001 | Freeny |
| 6,249,885 B1 | 6/2001 | Johnson et al. |
| 6,263,373 B1 | 7/2001 | Cromer et al. |
| 6,272,562 B1 | 8/2001 | Scott et al. |
| 6,288,753 B1 | 9/2001 | DeNicola et al. |
| 6,304,895 B1 | 10/2001 | Schneider et al. |
| 6,330,167 B1 | 12/2001 | Kobayashi |
| 6,360,250 B1 | 3/2002 | Anupam et al. |
| 6,377,461 B1 | 4/2002 | Ozmat et al. |
| 6,378,014 B1 | 4/2002 | Shirley |
| 6,389,464 B1 | 5/2002 | Krishnamurthy et al. |
| 6,397,256 B1 | 5/2002 | Chan et al. |
| 6,414,716 B1 | 7/2002 | Kawai |
| 6,434,003 B1 | 8/2002 | Roy et al. |
| 6,442,714 B1 * | 8/2002 | Griffin et al. ............ 714/46 |
| 6,476,854 B1 | 11/2002 | Emerson et al. |
| 6,480,901 B1 | 11/2002 | Weber et al. |
| 6,552,914 B1 | 4/2003 | Chang |
| 6,560,641 B1 | 5/2003 | Powderly et al. |
| 6,594,698 B1 | 7/2003 | Chow et al. |
| 6,601,119 B1 | 7/2003 | Slutz et al. |
| 6,603,665 B1 | 8/2003 | Truong et al. |
| 6,609,034 B1 | 8/2003 | Behrens et al. |
| 6,618,854 B1 | 9/2003 | Mann |
| 6,636,929 B1 | 10/2003 | Frantz et al. |
| 6,636,982 B1 | 10/2003 | Rowlands |
| 6,651,120 B2 | 11/2003 | Chiba et al. |
| 6,651,190 B1 | 11/2003 | Worley et al. |
| 6,662,217 B1 * | 12/2003 | Godfrey et al. ............ 709/219 |
| 6,664,969 B1 | 12/2003 | Emerson et al. |
| 6,681,250 B1 | 1/2004 | Thomas et al. |
| 6,690,410 B1 | 2/2004 | Mochida et al. |
| 6,754,891 B1 | 6/2004 | Snyder et al. |
| 6,779,004 B1 | 8/2004 | Zintel |
| 6,816,917 B2 | 11/2004 | Dicorpo et al. |
| 6,816,963 B1 | 11/2004 | Krithivas et al. |
| 6,820,267 B2 | 11/2004 | Christensen et al. |
| 6,823,401 B2 | 11/2004 | Feather et al. |
| 6,825,846 B2 | 11/2004 | Mondal |
| 6,857,005 B2 | 2/2005 | Kistler et al. |
| 6,859,882 B2 | 2/2005 | Fung |
| 6,894,906 B2 | 5/2005 | Sivertsen |
| 6,907,519 B2 | 6/2005 | Desoli |
| 6,952,743 B2 | 10/2005 | Ortega et al. |
| 6,959,380 B2 | 10/2005 | Dake et al. |
| 6,963,425 B1 | 11/2005 | Nair et al. |
| 6,990,577 B2 | 1/2006 | Autry |
| 6,993,747 B1 | 1/2006 | Friedman |
| 7,003,563 B2 | 2/2006 | Leigh et al. |
| 7,039,229 B2 | 5/2006 | Lin et al. |
| 7,076,400 B2 | 7/2006 | Dulberg et al. |
| 7,085,814 B1 | 8/2006 | Gandhi et al. |
| 7,149,796 B2 | 12/2006 | McDaniel-Sanders et al. |
| 7,165,041 B1 | 1/2007 | Guheen et al. |
| 7,181,510 B2 | 2/2007 | Emerson et al. |
| 7,206,875 B2 | 4/2007 | Marushak et al. |
| 7,209,874 B2 | 4/2007 | Salmonsen |
| 7,231,606 B2 | 6/2007 | Miller et al. |
| 7,233,336 B2 | 6/2007 | Mondal |
| 7,260,624 B2 | 8/2007 | Sivertsen et al. |
| 7,289,334 B2 | 10/2007 | Behrens et al. |
| 7,299,463 B2 | 11/2007 | Brannock et al. |
| 7,349,956 B2 | 3/2008 | Anderson et al. |
| 7,412,625 B2 | 8/2008 | Shankar et al. |
| 7,418,141 B2 | 8/2008 | Messer et al. |
| 7,454,490 B2 | 11/2008 | Sivertsen |
| 7,496,492 B2 | 2/2009 | Dai |
| 7,555,421 B1 | 6/2009 | Beckett et al. |
| 7,640,325 B1 | 12/2009 | DeKoning et al. |
| 7,657,665 B2 | 2/2010 | Dalton et al. |
| 7,702,763 B2 | 4/2010 | Slater et al. |
| 7,801,158 B2 * | 9/2010 | Voit et al. ............ 370/401 |
| 7,966,391 B2 | 6/2011 | Anderson et al. |
| 8,069,257 B1 | 11/2011 | Bhatia et al. |
| 2001/0027465 A1 | 10/2001 | Hammelbacher |
| 2001/0037366 A1 | 11/2001 | Web et al. |
| 2002/0040418 A1 | 4/2002 | Bress et al. |
| 2002/0078188 A1 | 6/2002 | Anand et al. |
| 2002/0083156 A1 | 6/2002 | Wyscoczynski |
| 2002/0087949 A1 | 7/2002 | Golender et al. |
| 2002/0097234 A1 | 7/2002 | Sauber |
| 2002/0103882 A1 | 8/2002 | Johnston et al. |
| 2002/0124128 A1 | 9/2002 | Qiu |
| 2002/0174415 A1 | 11/2002 | Hines |
| 2002/0178320 A1 | 11/2002 | Wu |
| 2002/0184165 A1 * | 12/2002 | Deboer et al. ............ 706/1 |
| 2002/0194403 A1 | 12/2002 | Pua et al. |
| 2002/0199035 A1 | 12/2002 | Christensen et al. |
| 2003/0023435 A1 | 1/2003 | Josephson |
| 2003/0035049 A1 | 2/2003 | Dickens et al. |
| 2003/0058248 A1 | 3/2003 | Hockmuth et al. |
| 2003/0074606 A1 * | 4/2003 | Boker ............ 714/42 |
| 2003/0083842 A1 | 5/2003 | Miller et al. |
| 2003/0110244 A1 | 6/2003 | Mondal |
| 2003/0120977 A1 | 6/2003 | Tang |
| 2003/0135674 A1 | 7/2003 | Mason et al. |
| 2003/0156132 A1 | 8/2003 | Gn et al. |
| 2003/0177111 A1 | 9/2003 | Egendorf et al. |
| 2003/0200273 A1 | 10/2003 | Khanna et al. |
| 2003/0216891 A1 * | 11/2003 | Wegener ............ 702/188 |
| 2003/0226015 A1 | 12/2003 | Neufeld et al. |
| 2004/0003317 A1 | 1/2004 | Kwatra et al. |
| 2004/0054838 A1 | 3/2004 | Hoese et al. |
| 2004/0059782 A1 | 3/2004 | Sivertsen |
| 2004/0139240 A1 | 7/2004 | DiCorpo et al. |
| 2004/0158614 A1 | 8/2004 | Williams |
| 2004/0199699 A1 | 10/2004 | Bobbitt et al. |
| 2004/0215617 A1 | 10/2004 | Ramsey et al. |
| 2004/0230668 A1 | 11/2004 | Carnahan et al. |
| 2004/0236843 A1 * | 11/2004 | Wing et al. ............ 709/219 |
| 2004/0255276 A1 | 12/2004 | Rovang |
| 2005/0020144 A1 | 1/2005 | Lunecki et al. |
| 2005/0021654 A1 | 1/2005 | Kern et al. |
| 2005/0021870 A1 | 1/2005 | Carnahan et al. |
| 2005/0044244 A1 | 2/2005 | Warwick et al. |
| 2005/0066000 A1 | 3/2005 | Liaw et al. |
| 2005/0086670 A1 | 4/2005 | Christensen et al. |
| 2005/0125519 A1 | 6/2005 | Yang et al. |
| 2005/0138346 A1 | 6/2005 | Cauthron |
| 2006/0098670 A1 * | 5/2006 | Voit et al. ............ 370/401 |
| 2006/0189900 A1 | 8/2006 | Flaherty |
| 2006/0195042 A1 | 8/2006 | Flaherty |
| 2007/0168746 A1 | 7/2007 | Righi et al. |
| 2011/0015918 A1 | 1/2011 | Kalbarga |

OTHER PUBLICATIONS

U.S. Appl. No. 13/240,253, filed Sep. 22, 2011, entitled "Method and System for Remote Software Debugging" first named inventor: Stefano Righi.

"Cable Allows Users to Extend DVI Connections," Jul. 31, 2001, *The Mac Observer*, printed from http://www.macobserver.com/article/2001/07/31.11.shtml, 4 pages.

"New KVM Switching System Controls 2,048 Servers Using Cat5 Cable" printout from Raritan website found at http://www.raritan.com/about/abt_press_detail.aspx?&status=4&articleId=127, printed May 23, 2006, 2 pages.

"Z-Series Information Page" printout from Raritan website found at www.Raritan.com/products/kvm_switches/z_series/prd_line. aspx. Printed Feb. 10, 2006, 1 page.
American Megatrends, Inc., AMIBIOS8, Introduction to AMIBIOS8™: Overview of Key Features in the Latest AMBIOS®, Version 1.20, Mar. 25, 2002, 22 pages.
American Megatrends, Inc., AMI Debug Source Level Modular Software Debugger, Data Sheet, Dec. 14, 2004, 2 pages.
American Megatrends, Inc. AMIDebug User's Guide (Version 2.0), 2002, 101 pages.
American Megatrends, Inc. AMIDiag for Windows User's Guide (Version 2.0), Feb. 25, 2002. http://ami.com/support/docc/MAN-DIAG-WIN.pdf, 108 pages.
AVIT Research, Ltyd., I²C Bus Tool, printed from www.avitresearch. co.uk/ on Aug. 29, 2005, 4 pages.
Calibre, "UCA93LV: USB—I²C Communications Adapter for PCs" Jan. 28, 2005, 2 pages.
Raritan Computer, Inc., "Raritan Announces New Paragon CIMs with Innovative DirectConnect Technology," a press release, Jan. 14, 2002, printed from www.raritan.com on Jan. 27, 2005, 2 pages.
Saelig Online Store, UCA93LV, printed from www..saelig.com on Aug. 29, 2005, 2 pages.
U.S. Official Action dated Aug. 13, 2003 in U.S. Appl. No. 10/016,484.
U.S. Official Action dated Mar. 8, 2004 in U.S. Appl. No. 10/016,484.
U.S. Official Action dated Jun. 22, 2004 in U.S. Appl. No. 10/016,484.
U.S. Notice of Allowance and Allowability dated Jul. 15, 2004 in U.S. Appl. No. 10/016,484.
U.S. Official Action dated Feb. 23, 2004 in U.S. Appl. No. 10/247,876.
U.S. Official Action dated Aug. 3, 2004 in U.S. Appl. No. 10/247,876.
U.S. Official Action dated Feb. 3, 2005 in U.S. Appl. No. 10/247,876.
U.S. Official Action dated Aug. 8, 2005 in U.S. Appl. No. 10/247,876.
U.S. Official Action dated Feb. 24, 2006 in U.S. Appl. No. 10/247,876.
U.S. Official Action dated Aug. 17, 2006 in U.S. Appl. No. 10/247,876.
U.S. Notice of Allowance and Allowability dated Apr. 11, 2007 in U.S. Appl. No. 10/247,876.
U.S. Official Action dated Sep. 19, 2006 in U.S. Appl. No. 10/403,198.
U.S. Official Action dated Mar. 6, 2007 in U.S. Appl. No. 10/403,198.
U.S. Notice of Allowance and Allowability dated May 31, 2007 in U.S. Appl. No. 10/403,198.
U.S. Notice of Allowance and Allowability dated Sep. 18, 2007 in U.S. Appl. No. 10/403,198.
U.S. Notice of Allowance and Allowability dated Jan. 11, 2008 in U.S. Appl. No. 10/403,198.
U.S. Notice of Allowance and Allowability dated May 13, 2008 in U.S. Appl. No. 10/403,198.
U.S. Official Action dated Jan. 24, 2006 in U.S. Appl. No. 10/446,044.
U.S. Official Action dated Jul. 14, 2006 in U.S. Appl. No. 10/446,044.
U.S. Official Action dated Oct. 5, 2006 in U.S. Appl. No. 10/446,044.
U.S. Official Action dated Apr. 5, 2007 in U.S. Appl. No. 10/446,044.
U.S. Official Action dated Sep. 18, 2007 in U.S. Appl. No. 10/446,044.
U.S. Official Action dated Jan. 8, 2008 in U.S. Appl. No. 10/446,044.
U.S. Notice of Allowance and Allowability dated Jun. 9, 2008 in U.S. Appl. No. 10/446,044.
U.S. Official Action dated Sep. 11, 2006 in U.S. Appl. No. 10/462,509.
U.S. Official Action dated Mar. 6, 2007 in U.S. Appl. No. 10/462,509.
U.S. Official Action dated Jun. 29, 2007 in U.S. Appl. No. 10/462,509.
U.S. Notice of Allowance and Allowability dated Nov. 1, 2007 in U.S. Appl. No. 10/462,509.
U.S. Official Action dated Nov. 29, 2007 in U.S. Appl. No. 10/462,509.
U.S. Official Action dated Jul. 9, 2008 in U.S. Appl. No. 10/462,509.
U.S. Notice of Allowance / Allowability dated Jan. 26, 2009 in U.S. Appl. No. 10/462,509.
U.S. Appl. No. 10/790,160, filed Mar. 1, 2004, entitled "Method, System and Apparatus for Communicating with a Computer Management Device," Inventor: Subash Kalbarga.
U.S. Official Action dated Dec. 17, 2007 in U.S. Appl. No. 10/790,160.
U.S. Official Action dated Jun. 25, 2008 in U.S. Appl. No. 10/790,160.
U.S. Official Action dated Jan. 7, 2009 in U.S. Appl. No. 10/790,160.
U.S. Official Action dated Jul. 1, 2009 in U.S. Appl. No. 10/790,160.
U.S. Official Action dated Dec. 23, 2009 in U.S. Appl. No. 10/790,160.
U.S. Notice of Allowance / Allowability dated Jun. 24, 2010 in U.S. Appl. No. 10/790,160.
U.S. Notice of Allowance and Allowability dated Nov. 10, 2004 in U.S. Appl. No. 10/867,348.
U.S. Official Action dated Feb. 27, 2007 in U.S. Appl. No. 10/867,406.
U.S. Official Action dated Aug. 10, 2007 in U.S. Appl. No. 10/867,406.
U.S. Official Action dated Dec. 27, 2007 in U.S. Appl. No. 10/867,406.
U.S. Notice of Allowance / Allowability dated Jul. 23, 2008 in U.S. Appl. No. 10/867,406.
U.S. Appl. No. 10/875,641, filed Jun. 24, 2004, Entitled "Method and System for Remote Software Debugging", Inventors: Stefano Righi and Eric Mills.
U.S. Official Action dated Jul. 27, 2007 in U.S. Appl. No. 10/875,641.
U.S. Official Action dated Jan. 10, 2008 in U.S. Appl. No. 10/875,641.
U.S. Official Action dated Jun. 3, 2008 in U.S. Appl. No. 10/875,641.
U.S. Notice of Allowance / Allowability dated Jan. 8, 2009 in U.S. Appl. No. 10/875,641.
U.S. Appl. No. 10/926,241, filed Aug. 25, 2004, entitled "Apparatus, Methods, and Systems for Redirecting Input and Output for Multiple Computers," Inventor: Clas Gerhard Sivertsen.
U.S. Official Action dated Sep. 8, 2008 in U.S. Appl. No. 10/926,241.
U.S. Notice of Allowance / Allowability dated Dec. 2, 2008 in U.S. Appl. No. 10/926,241.
U.S. Official Action dated Apr. 18, 2006 in U.S. Appl. No. 10/966,221.
U.S. Official Action dated Sep. 5, 2006 in U.S. Appl. No. 10/966,221.
U.S. Notice of Allowance and Allowability dated Jan. 5, 2007 in U.S. Appl. No. 10/966,221.
U.S. Official Action dated May 14, 2008 in U.S. Appl. No. 11/300,045.
U.S. Official Action dated Dec. 2, 2008 in U.S. Appl. No. 11/300,045.
U.S. Official Action dated May 27, 2009 in U.S. Appl. No. 11/300,045.
U.S. Official Action dated Dec. 8, 2009 in U.S. Appl. No. 11/300,045.
U.S. Official Action dated Nov. 23, 2010 in U.S. Appl. No. 11/300,045.
U.S. Appl. No. 12/395,015, filed Feb. 27, 2009, entitled "Redirecting Input and Output for Multiple Computers", Inventor: Clas Gerhard Sivertsen.
U.S. Official Action dated Dec. 30, 2009 in U.S. Appl. No. 12/395,015.
U.S. Official Action dated Jun. 18, 2010 in U.S. Appl. No. 12/395,015.
U.S. Notice of Allowance / Allowability dated Aug. 30, 2010 in U.S. Appl. No. 12/395,015.
U.S. Appl. No. 12/395,022, filed Feb. 27, 2009, entitled "Redirecting Input and Output for Multiple Computers", Inventor: Clas Gerhard Sivertsen.
U.S. Official Action dated Aug. 24, 2009 in U.S. Appl. No. 12/395,022.
U.S. Notice of Allowance / Allowability dated Mar. 11, 2010 in U.S. Appl. No. 12/395,022.
U.S. Appl. No. 12/395,028, filed Feb. 27, 2009, entitled "Redirecting Input and Output for Multiple Computers", Inventor: Clas Gerhard Sivertsen.
QuikSpecs: Compaq PCI Card KVM Switches, Version 5, Mar. 13, 2003, 5 pages.

U.S. Official Action dated Apr. 23, 2010 in U.S. Appl. No. 12/395,028.

U.S. Notice of Allowance / Allowability dated Sep. 23, 2010 in U.S. Appl. No. 12/395,028.

U.S. Appl. No. 12/425,455, filed Apr. 17, 2009, entitled "Method and System for Remote Software Debugging", Inventors: Righi et al.

U.S. Notice of Allowance / Allowability dated Jan. 3, 2011 in U.S. Appl. No. 12/470,854.

U.S. Official Action dated Aug. 16, 2011 in U.S. Appl. No. 12/889,933, filed Sep. 24, 2010, first named inventor: Subash Kalbarga.

U.S. Appl. No. 13/183,076, filed Jul. 14, 2011, entitled "System and Method for Debugging a Target Computer Using SMBus" first named inventor: Stefano Righi.

U.S. Notice of Allowance/Allowability dated Apr. 14, 2011 in U.S. Appl. No. 11/300,045, filed Dec. 14, 2005, first named inventor: Stefano Righi.

U.S. Notice of Allowance/Allowability dated Apr. 21, 2011 in U.S. Appl. No. 12/948,400, filed Nov. 17, 2010, Inventor Clas G. Sivertsen.

U.S. Notice of Allowance/Allowability dated Jun. 22, 2011 in U.S. Appl. No. 12/425,455, filed Apr. 17, 2009, Inventor Stefano Righi.

U.S. Appl. No. 12/948,400, filed Nov. 19, 2010, entitled "Redirecting Input and Output for Multiple Computers," Inventor: Clas G. Sivertsen.

U.S. Official Action dated Dec. 27, 2010 in U.S. Appl. No. 12/948,400.

U.S. Official Action dated Nov. 20, 2012 in U.S. Appl. No. 13/183,076.

U.S. Official Action dated Jun. 5, 2012 in U.S. Appl. No. 12/889,933.

U.S. Notice of Allowance/Allowability dated Oct. 1, 2012 in U.S. Appl. No. 12/889,933.

U.S. Official Action dated Mar. 29, 2013 in U.S. Appl. No. 13/240,253.

U.S. Notice of Allowance/Allowability dated May 15, 2013 in U.S. Appl. No. 13/183,076.

Shimonski, R. "Using Remote Desktop with Windows XP Professional", published Dec. 7, 2004 (Windows XP release date Oct. 25, 2001) [online][retrieved on Mar. 22, 2013] retrieved from: http://www.windowsnetworking.com/articles-tutorials/windows-xp/Using-Remote-Desktop-Windows-XP-Pro.html, 9 pps.

U.S. Notice of Allowance/Allowability dated Jun. 20, 2013 in U.S. Appl. No. 13/183,076.

* cited by examiner

METHOD AND SYSTEM FOR REMOTE SOFTWARE TESTING

CROSS-REFERENCE TO RELATED APPLICATIONS

This application is a continuation of and claims the benefit of U.S. patent application Ser. No. 12/470,854 entitled "Method and System for Remote Software Testing," filed May 22, 2009, now U.S. Pat. No. 7,945,899, which is a continuation of U.S. patent application Ser. No. 10/462,509, now U.S. Pat. No. 7,546,584 entitled "Method and System for Remote Software Testing," filed Jun. 16, 2003, for which the entire contents of each are expressly incorporated herein by reference.

TECHNICAL FIELD

Embodiments of the invention relate generally to the field of software testing. More particularly, embodiments of the invention relate to the field of remote automated software testing.

BACKGROUND OF THE INVENTION

One of the most important parts of the software development process is the process of software testing. Testing refers to the process of repetitively executing portions of a computer program to ensure that the program is functioning correctly and to identify errors within the executing program code. Testing is often performed by a human user of the computer. However, because the testing process can be very repetitive, and therefore stressful on humans, automated testing programs have been developed that simulate human user input to a computer program. In particular, scripts can be generated for use with an automated testing program that simulate user input to the program to be tested in a particular order. For instance, a script may contain instructions for entering keystrokes, mouse movement and selection, and other types of user input commands. In order to thoroughly test a computer program, such scripts can be executed repetitively by the automated testing program on the program to be tested.

Traditionally, an automated testing program must be run directly on the computer system that is executing the software that is being tested. This, however, greatly hinders the software testing process because the user performing the testing must be in close proximity to the system being tested. This may be extremely inconvenient when it is necessary to test the software components of a computer system that is located across the country or even the world.

It is with respect to these considerations and others that the various embodiments of the present invention have been made.

SUMMARY OF THE INVENTION

In accordance with the present invention, the above and other problems are solved by methods and systems for remotely testing a software program. These systems and methods make use of one or more operating system independent video and input/output redirection devices that allow remote control of the computer system from any network-connected location. By using such redirection devices in conjunction with an automated testing program, software components may be tested from virtually anywhere in the world.

In accordance with other aspects, the present invention relates to a system for testing a computer program executing on a computer (the "remote computer") located remotely from another computer (the "local computer"). The remote computer is connected to a network, such as a local area network ("LAN") or the Internet, and includes an operating system independent video and input/output redirection device (referred to herein as a "redirection device"). The redirection device is operative to transmit the video output of the remote computer to the local computer via the network connection.

The redirection device can also receive user input commands provided at the local computer and provide the input commands to the remote computer as if the input commands were physically generated by a user at the remote computer. In this manner, a user of the local computer, or an automated testing program executing on the remote computer, can control the operation of the remote computer from a remote location, regardless of the type of operating system utilized by the remote computer.

The remote computer also includes a software program to be tested, such as an operating system program, a basic input/output system ("BIOS") program, or an application program. The local computer includes a remote control software application, such as a plug-in executing within a World Wide Web ("Web") browser, operative to receive and display the video output transmitted from the remote computer. The remote control application also receives user input commands, such as keyboard or mouse commands, received at the local computer and transmits the commands to the redirection device. The local computer also includes an automated testing program operative to generate a sequence of user input commands for testing the computer program. The output of the automated testing program may be directed toward the display provided by the remote control application and, subsequently, to the computer program executing on the remote computer. In this manner, the automated testing program, in conjunction with the remote control application and the redirection device, may be utilized to execute commands on the computer program to be tested executing on the remote computer.

In accordance with other aspects, the invention relates to a method for testing a computer program executing on a remote computer from a local computer. According to the method, the remote computer executes a computer program to be tested. The video output of the remote computer, including the screen display generated by the computer program to be tested, is transmitted to the remote computer. The video output of the remote computer, including the screen display generated by the program to be tested, is then displayed at the local computer.

User input commands may be generated at the local computer by an automated testing program and directed to the screen display generated by the computer program to be tested. The user input commands are then transmitted from the local computer to the remote computer and executed at the remote computer to control the operation of the computer program to be tested. The user input commands are executed at the remote computer as if the commands were physically generated at the remote computer by one or more input devices physically connected to the remote computer.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for remotely testing a computer software program. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
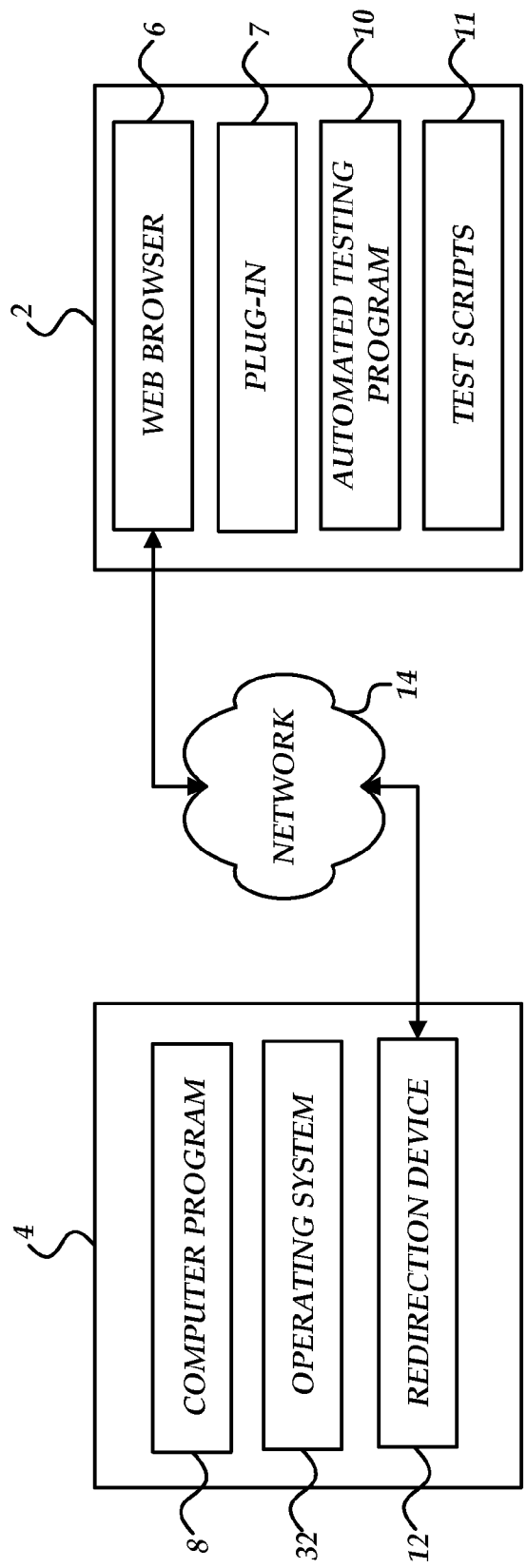
FIG. 1 illustrates a system for remotely testing a computer program provided in one embodiment of the invention.
Figure 2:
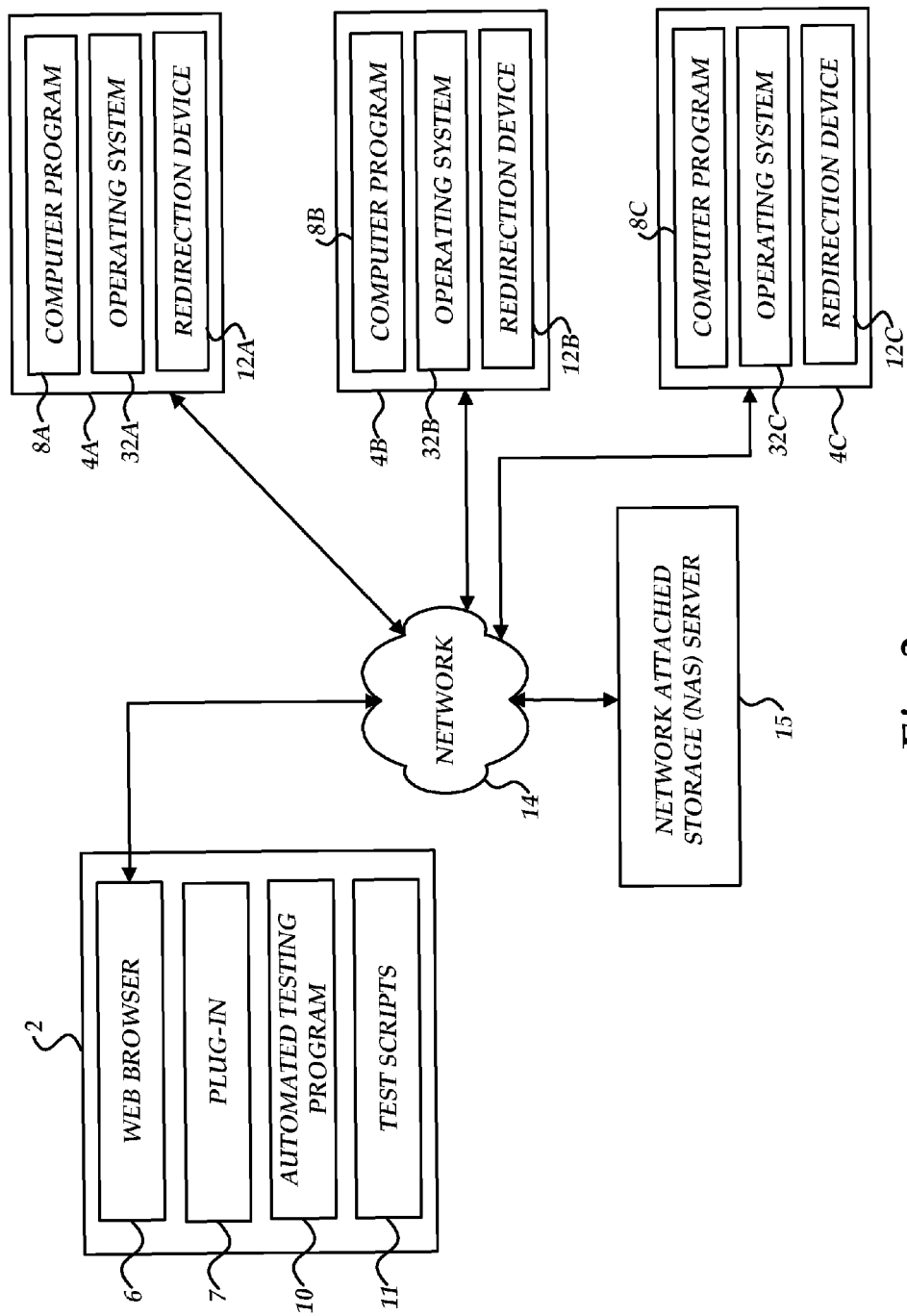
FIG. 2 shows a system for remotely testing a computer program provided in another embodiment of the invention.

Referring now to the drawings, in which like numerals represent like elements through the several figures, aspects of the present invention and the exemplary operating environment will be described. FIGS. 1-2 and the following discussion are intended to provide a brief, general description of a suitable computing environment in which the embodiments of the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a system for remotely testing a computer program provided in one embodiment of the invention will be described. As shown in FIG. 1, the system includes a local computer 2. The local computer 2 comprises a standard personal or server computer operative to execute a Web browser application program 6, such as the INTERNET EXPLORER browser from MICROSOFT CORPORATION of Redmond, Wash. Alternatively, the local computer 2 may comprise another type of computing device operative to access a network 14, such as a personal digital assistant or other type of computer. The local computer 2 is also connected to a network 14, such as a LAN or the Internet. It should be appreciated, however, that the local computer 2 may be configured for communication over other types of distributed computing networks.

The local computer 2 also includes a plug-in 7 for use in conjunction with the Web browser 6. As known to those skilled in the art, plug-ins may be created utilizing ACTIVEX technology from MICROSOFT CORPORATION, JAVA from SUN MICROSYSTEMS, or other similar technologies from other vendors, that allow special functions to be performed within a Web browser. In particular, the plug-in 7 executes in conjunction with the Web browser 6 and communicates with a redirection device 12 operating in conjunction with a remote computer 4. As will be described in greater detail below, the plug-in 7 receives screen displays from the redirection device 12 and displays them at the local computer 2. The plug-in 7 also receives user input commands, such as mouse or keyboard commands, from an automated testing program 10 executing on the local computer 2 and transmits these commands to the redirection device 12. The redirection device 12 may then provide the commands to remote computer 4, where they may be executed on the remote computer 4 as if they were physically received via an input device connected directly to the remote computer 4.

The automated testing program 10 comprises an application program for testing the functionality of programs executing on a computer system. In particular, the automated testing program 10 allows the creating of test scripts 11 that define a sequence of user interface commands that should be executed on the computer. When the test scripts are executed by the automated testing program 10, the input commands are executed on the computer as if the commands were generated by a user physically utilizing the computer. For instance, keystrokes, mouse movements, mouse clicks, and other types of user interface commands may be generated. As will be discussed in greater detail below, the user interface commands generated by the automated testing program 10 may be applied to a user interface window displayed at the local computer by the plug-in 7 and including a screen display generated by the computer program 8 executing on the remote computer 4. One example of an automated testing program 10 is the WINRUNNER automated testing program provided by MERCURY INTERACTIVE, INC., of Sunnyvale, Calif. It should be appreciated that other types of automated testing programs may be similarly utilized.

The remote computer 4 also comprises a standard desktop or server computer system. The remote computer 4 is connected to the network 14 and is operative to execute a computer program 8 to be tested. The computer program 8 to be tested may comprise an operating system 32 program, a BIOS, an application program, or any other type of program capable of being executed on the remote computer 4.

The remote computer 4 also supports the use of an operating system independent video and input/output redirection device (referred to herein as a "redirection device"). The redirection device receives the video output of the remote computer 4 and compresses the video output for transmission to the plug-in 7 executing on the local computer 2. The redirection device then transmits the compressed video output of the remote computer 4 to the plug-in 7 executing on the local computer 2 via the network connection. The plug-in 7 is operative to decompress the data stream and to display the video output of the remote computer 4 on the local computer 2. The displayed output may include screen displays generated by the computer program 8 or the operating system 32.

The plug-in 7 is also operative to receive user input commands, such as mouse or keyboard commands, generated at the local computer 2 either by a user or by the automated testing program 10 and to transmit the commands to the redirection device 12. The redirection device 12 can receive the user input commands from the plug-in 7 and provide the input commands to the remote computer 4 as if the input commands were physically generated by a user at the remote computer 4. In order to provide this functionality, the redirection device 12 may be physically and electrically connected to the input ports of the remote computer 4 (serial, Universal Serial Bus ("USB"), etc.). The redirection device 12 may also provide connections for user input devices located at the remote computer 4 and may pass through signals received at the user input devices to the remote computer 4. In this manner, user input commands generated by a user physically located at the remote computer 4 may be passed through to the remote computer 4.

Moreover, through the use of the plug-in 7 and the redirection device 12, a user of the local computer 2 can control the operation of the remote computer 4 from a remote location. In particular, a user of the local computer 2 can utilize the output of the automated testing program 10 to test the execution of the computer program 8. According to one embodiment of the invention, the computer program 8 comprises a basic input/output system ("BIOS") utilized by the remote computer 4. However, the computer program 8 may comprise other types of computer programs, such as operating system programs, application programs, device drivers, and others.

It should be appreciated that the redirection device may comprise a device located internal to the remote computer 4 or an external device connected to the external connections of the remote computer 4. One example of an external redirection device comprises an external device that may be connected to the external video output of the remote computer 4, to the network 14, and to the user input devices located at the remote computer 4. Such a device is described in U.S. Pat. No. 7,260,624, entitled "Systems and Methods for Establishing Interaction Between A Local Computer and a Remote Computer", which is assigned to the assignee of the instant patent application and expressly incorporated herein.

Another embodiment may comprise a redirection device that is integrated with the main system board of the remote computer 4 or contained on an adapter card located within the remote computer 4. Such a device is described in U.S. Pat. No. 6,825,846, entitled "Systems and Methods for Capturing Screen Displays From A Host Computing System for Display At A Remote Terminal", which is also assigned to the assignee of the instant patent application and expressly incorporated herein. It should be appreciated that other types of redirection devices may also be utilized.

Referring now to FIG. 2, a system for remotely testing a computer program provided in another actual embodiment of the invention will be described. As shown in FIG. 2, the system includes a local computer 2 and three remote computers 4A, 4B, and 4C. As with the system described above, the local computer 2 comprises a standard personal or server computer operative to execute a Web browser application program 6 and a plug-in 7. The local computer 2 is also connected to a network 14, such as a LAN or the Internet, and may be configured for communication over other types of distributed computing networks.

The local computer 2 also includes a plug-in 7 for use in conjunction with the Web browser 6. In particular, the plug-in 7 executes in conjunction with the Web browser 6 and communicates with a redirection device 12A operating in conjunction with a remote computer 4A. As in the system described above, the plug-in 7 receives screen displays from the redirection device 12A and displays them at the local computer 2. The plug-in 7 also receives user input commands, such as mouse or keyboard commands, from a user of the local computer 2 or an automated testing program 10 and transmits these commands to the redirection device 12A. The redirection device 12A may then provide the commands to remote computer 4A, where they may be executed on the remote computer 4A as if they were physically received via an input device connected directly to the remote computer 4A. Multiple instances of the Web browser 6 and the plug-in 7 may be utilized on the local computer 2 to communicate with other redirection devices, such as the redirection device 12B utilized by the remote computer 4B and the redirection device 12C utilized by the remote computer 4C.

The remote computers 4A, 4B, and 4C also comprise standard desktop or server computer systems. The remote computer 4A is connected to the network 14 and is operative to execute a computer program 8A. As described briefly above, the automated testing program 10, in conjunction with the plug-in 7, the Web browser 6, and the redirection device 12A, may be utilized to test the operation of the computer program 8A. In particular, according to one embodiment, the computer program 8A is operative to access one or more storage volumes maintained by the network attached storage ("NAS") server 15. Alternatively, the automated testing program 10 may control aspects of the operating system 32A for accessing the storage volume maintained by the NAS server 15. Because the redirection devices 12A, 12B, and 12C are operating system independent, different types of operating systems may be utilized to access the storage volumes maintained by the NAS server 15. Comprehensive tests may therefore be automated and performed to test the interaction of the NAS server 15 with computers, such as the remote computers 4A, 4B, and 4C, executing different types of operating systems. It should be appreciated that other types of server computers other than a NAS server 15 may be utilized to provide data storage volumes.

As shown in FIG. 2, the remote computers 4A, 4B, and 4C include redirection devices 12A, 12B, and 12C respectively. As discussed above, the redirection devices 12A, 12B, and 12C, allow a user of the local computer 2 to control the operation of the remote computers 4A, 4B, and 4C from a remote location. In particular, a first instance of the Web browser 6 and the plug-in 7 may be utilized on the local computer 2 to view the screen output of the remote computer 4A, including screen displays generated by the computer program 8A, and to test the execution of the computer program 8A on the remote computer 4A. Another instance of the Web browser 6 and the plug-in 7 may be utilized on the local computer 2 to view the screen output of the remote computer 4B, including screen displays generated by the computer program 8B, and to test the computer program 8B executing on the remote computer 4B. Additionally, yet another instance of the Web browser 6 and the plug-in 7 may be utilized on the local computer 2 to view the screen output of the remote computer 4C, including screen displays generated by the computer program 8C, and to test the computer program 8C executing on the remote computer 4C.

Figure 3:
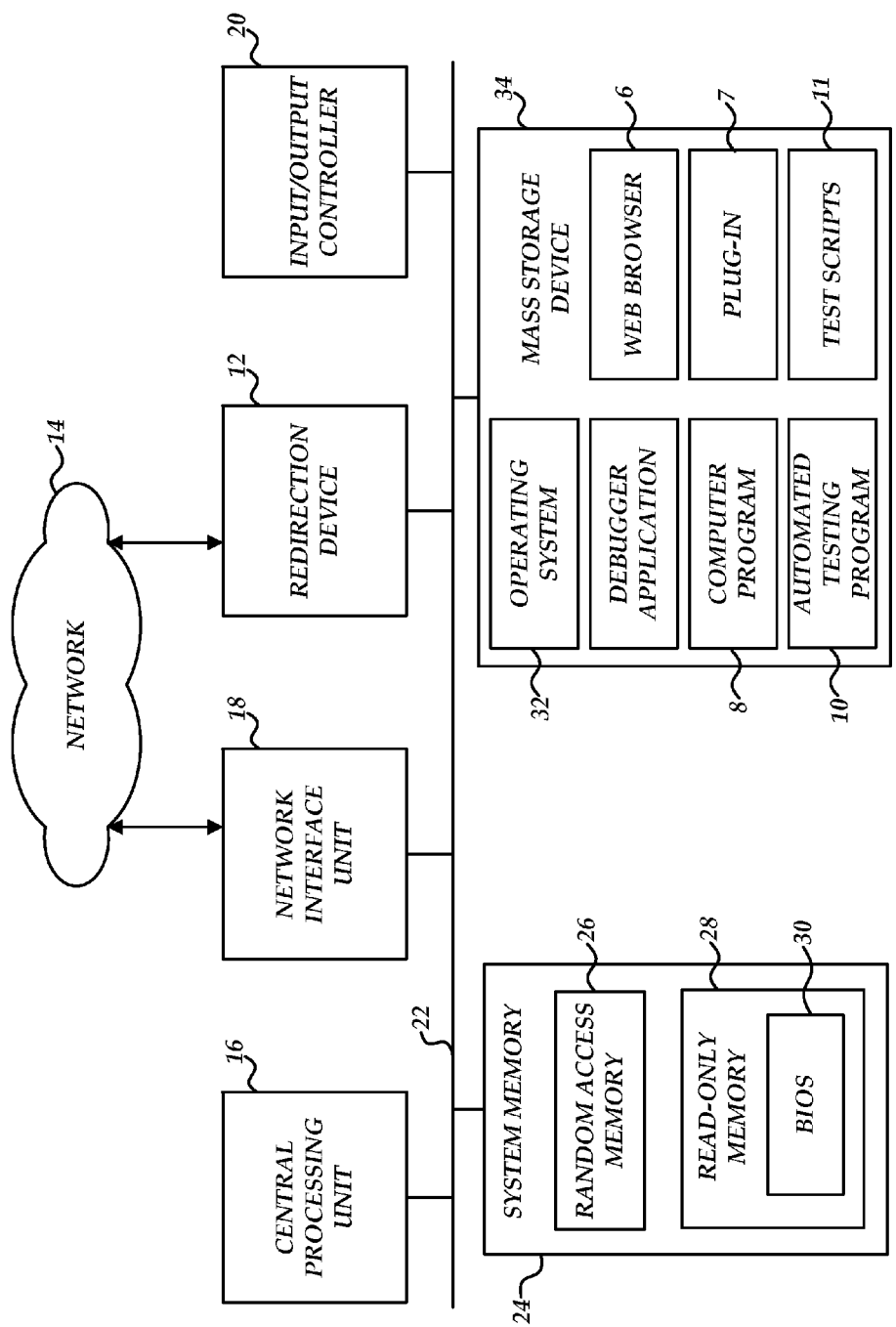
FIG. 3 illustrates a computer architecture for a computer system utilized in the various embodiments of the invention.

Referring now to FIG. 3, an illustrative computer architecture for a computer 4 for practicing the various embodiments of the invention will be described. The computer architecture shown in FIG. 3 illustrates a conventional server or personal computer, including a central processing unit 16 ("CPU"), a system memory 24, including a random access memory 26 ("RAM") and a read-only memory ("ROM") 28, and a system bus 22 that couples the memory to the CPU 16. A basic input/output system 30 containing the basic routines that help to transfer information between elements within the computer, such as during startup, is stored in the ROM 28. The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 also stores application programs, such as the computer program 8, the automated testing program 10, the Web browser 6 and plug-in 7, and data, such as the test scripts 11 used by the automated testing program 10.

The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 3). Similarly, an input/output controller 20 may provide output to a display screen, a printer, or other type of output device.

The computer 4 also includes a redirection device 12. As described above, the redirection device may be internal or external to the computer 4. The redirection device receives and compresses the video output of the computer 4 for transmission over the network 14. The redirection device 12 also transmits the compressed screen displays to a plug-in 7 executing on a remotely located computer, where the data may be decompressed and displayed. Because the redirection device 12 is implemented in hardware, operation of the redirection device 12 is not dependent on the execution of a particular type of operating system 32. Moreover, because the redirection device 12 is implemented in hardware, the operating system 32 does not have to be loaded by the computer 4 for the screen displays of the computer 4 to be compressed and transmitted. In this manner, the computer 4 may be remotely controlled immediately after it is powered on and without the need to load any operating system.

As discussed briefly above, the redirection device also includes input/output ports for connecting peripheral input devices that would otherwise be connected to the computer 4. In particular, a mouse and keyboard (not shown in FIG. 3) may be directly connected to the redirection device 12. Input commands received by these devices may then be passed by the redirection device 12 to the input/output controller 20. Additionally, user input commands may also be received by the plug-in 7 at a remote computer. These commands may be generated by a user or by an automated testing program 10 and are transmitted by the plug-in 7 to the redirection device 12. The remotely generated commands are also passed from the redirection device 12 to the input/output controller 20 for execution on the computer 4 as if the commands were generated locally. In this manner, the operation of the computer 4 and, in particular, the operation of the computer program 8, may be completely controlled from a remote computer.

Figure 4:
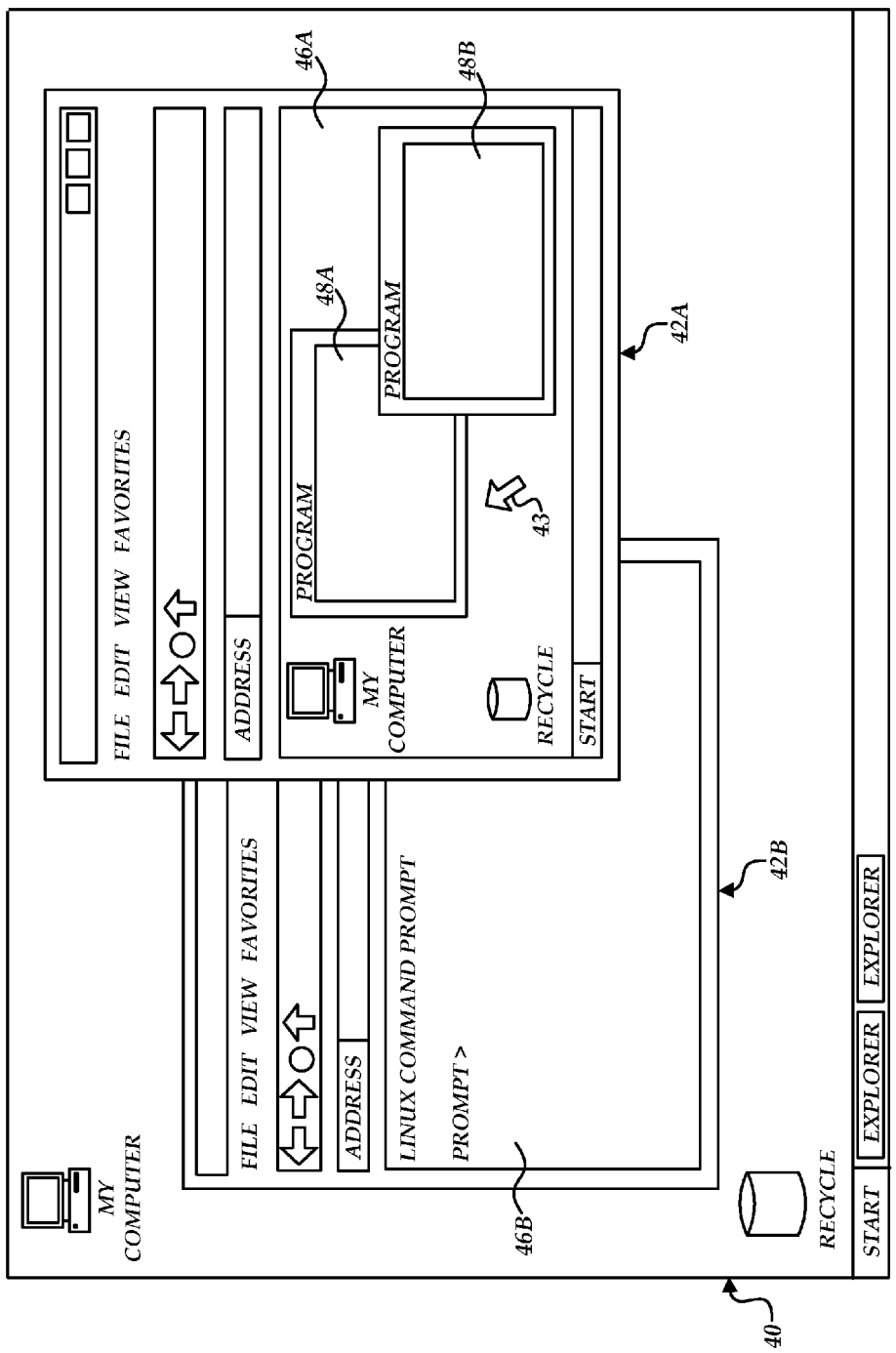
FIG. 4 shows a screen display produced by a computer system provided in one embodiment of the invention.

Turning now to FIG. 4, an illustrative screen display 40 provided by a local computer 2 will be described. The screen display 40 shows an illustrative screen display provided by a computer 2 executing the MICROSOFT WINDOWS XP operating system and communicating with two remote computers 4A and 4B. In particular, the screen display 40 shows a first user interface window 42A generated by the MICROSOFT INTERNET EXPLORER Web browser executing a plug-in 7 and connected to a remote computer 4A. The user interface window 42A includes the entire screen display generated by the remote computer 4A, including the user interface desktop 46A, a user interface window 48A generated by a computer program 8A executing on the remote computer 4A. As described above, the screen display shown in the window 42A is compressed by the redirection device 12A and transmitted to the local computer 2, where it is displayed. Additionally, the automated testing program 10 executing on the local computer 2 may generate user input commands in the window 42A. These commands are received by the plug-in 7 and transmitted to the redirection device 12A for execution on the remote computer 4A.

The user interface window 42B includes a screen display generated by the remote computer 4B. In particular, as shown in FIG. 4, the user interface window 42B includes a screen display generated by an operating system 32B executing on the remote computer 4B. It should be appreciated that more than three instances of the Web browser 6 and plug-in 7 may be utilized to simultaneously test software executing on any number of computers equipped with redirection devices. It should also be appreciated that the user interface windows 42A and 42B may be maximized to encompass the entire display screen. In this manner, the display shown at the local computer 2 would be identical to that generated by one of the remote computers.

Figure 5:
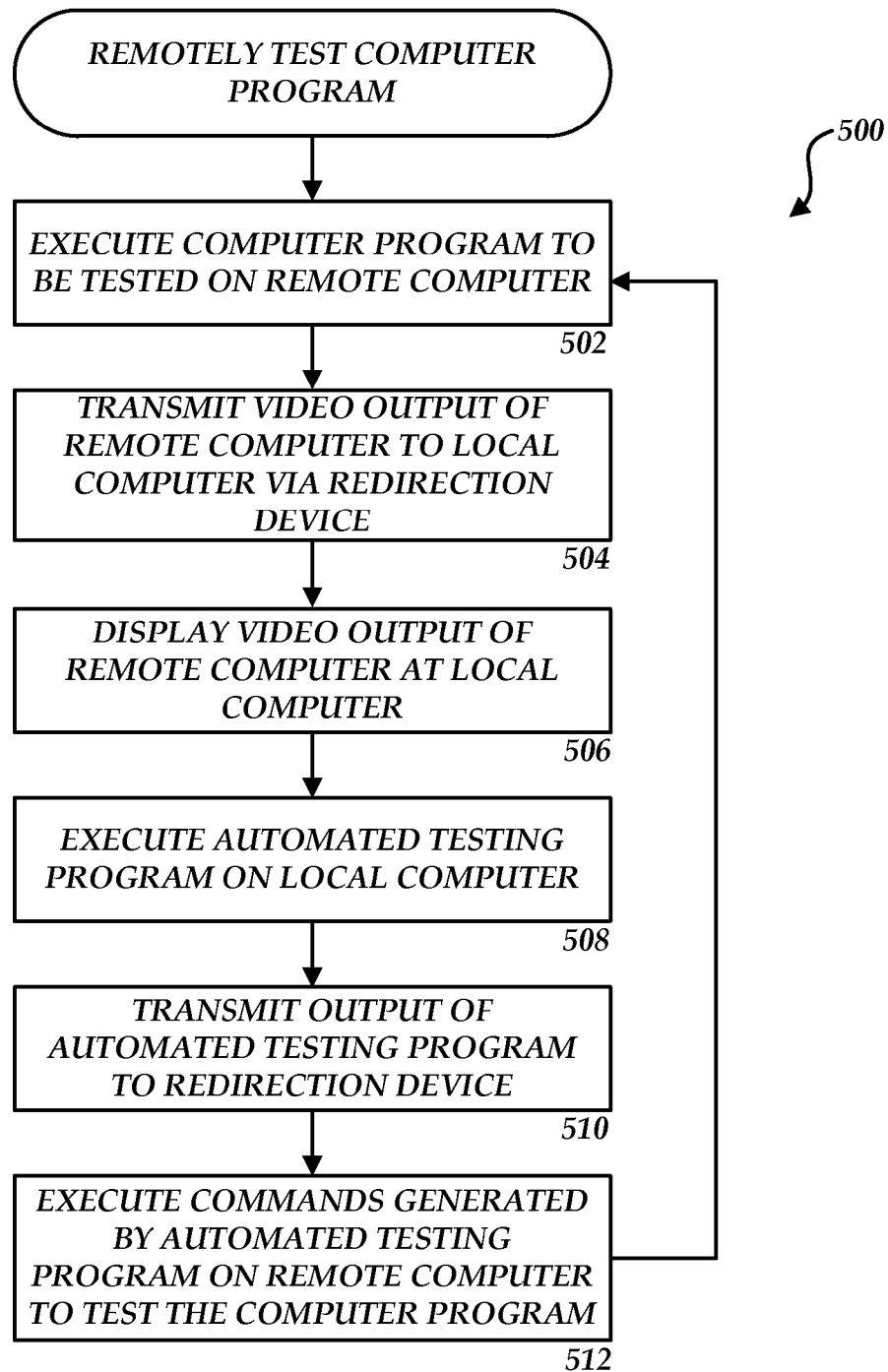
FIG. 5 illustrates an operational flow for remotely testing a computer program utilized in one embodiment of the invention.

Turning now to FIGS. 1 and 5, an illustrative routine 500 will be described for controlling the operation of the system for remotely testing a software program according to one embodiment of the invention. The routine 500 begins at block 502, where the remote computer 4 executes the computer program 8 to be tested. From block 502, the routine 500 continues to block 504, where the compressed video output of the remote computer 4 is transmitted to the plug-in 7 by the redirection device 12. At block 506, the plug-in 7 receives the compressed video output and displays the output on the local computer 2 in a window or full screen. It should be appreciated that the redirection device 12 and the plug-in 7 perform the transmitting and displaying functions, respectively, in a continual manner so that an updated video display is continually displayed at the local computer 2. Moreover, it should be appreciated that displaying the video output of the remote computer 4 at the local computer 2 is not necessary to test the computer program 8.

From block 506, the routine 500 continues to block 508, where the automated testing program 10 is executed at the local computer 2. User input commands generated by the automated testing program 10 based on the test scripts 11 are directed to the display of the remote computer 4. The commands generated by the automated testing program 10 are received by the plug-in 7 and are transmitted to the redirection device 12 at block 510. The commands may then be passed by the redirection device 12 to the remote computer 4 for execution at the remote computer 4 as if the commands were received at input devices physically connected to the remote computer 4. In particular, user input commands may be generated by the automated testing program 10 that are directed to screen displays generated by the computer program 8. The user interface commands may then be passed to the remote computer 4 and executed on the computer program 8 as if the commands were generated by a user located physically proximate to the remote computer 4 at block 512. In this manner, the automated testing program 10 may be utilized to test the execution of the computer program 8 from a remote location. From block 512, the routine 500 returns to block 502, where the above-described process repeats.

Based on the foregoing, it should be appreciated that the various embodiments of the invention provide methods and systems for remotely testing a software program. The above specification, examples and data provide a complete description of the manufacture and use of the composition of the invention. Since many embodiments of the invention can be made without departing from the spirit and scope of the invention, the invention resides in the claims hereinafter appended.

I claim:

1. A system for testing a computer program executing on a first computer from a second computer, the system comprising:
   the first computer operative to execute the computer program, the first computer comprising an operating system independent video and input/output redirection device operative to:
   transmit, via a connection between the first computer and a network, video output of the first computer to the second computer, the video output associated with the computer program,
   receive, via the connection between the first computer and the network, a user input command transmitted from the second computer; and
   provide the user input command to the first computer as if the user input command was physically generated at the first computer; and
   the second computer operative to execute a software application, the software application operative to:
   receive, via a connection between the second computer and the network, the video output of the first computer,
   display the video output of the first computer,
   receive, from an automated testing program executing on the second computer, the user input command generated by the automated testing program, the user input command directed toward the video output of the first computer displayed, and
   transmit, via the connection between the second computer and the network, the user input command to the operating system independent video and input/output redirection device.

2. The system of claim 1, wherein the input/output redirection device is operative to transmit the video output of the first computer to the second computer as data capable of being displayed in a web browser application, and wherein the software application comprises the web browser application.

3. The system of claim 1, wherein the video output of the first computer includes a screen display generated by the computer program and wherein the user input command generated by the automated testing program is directed toward the screen display.

4. The system of claim 1, wherein the first computer and the second computer are physically located at two different locations and wherein the first computer and the second computer are connected via a communications network.

5. The system of claim 1, wherein the computer program executing on the first computer comprises an operating system program.

6. The system of claim 1, wherein the computer program executing on the first computer comprises a basic input/output system program.

7. The system of claim 1, wherein the computer program executing on the first computer comprises an application program.

8. The system of claim 1, further comprising a third computer operative to provide a storage volume and wherein the computer program is operative to access data stored in the storage volume.

9. A method for testing a computer program executing on a remote computer from a local computer, the method comprising:
   executing, by the remote computer, the computer program to be tested;
   transmitting, by a redirection device of the remote computer via a connection between the remote computer and a network, video output of the remote computer to the local computer, the video output associated with the computer program;
   displaying, at the local computer, the video output of the remote computer;
   receiving, at the local computer from an automated testing program executing on the local computer, a user input command generated by the automated testing program, the user input command directed toward the video output associated with the computer program executing on the remote computer;
   transmitting, by the local computer via a connection between the local computer and the network, the user input command to the remote computer;
   receiving, by the redirection device of the remote computer via the connection between the remote computer and the network, the user input command transmitted by the local computer; and
   executing, by the remote computer, the user input command to test the computer program as if the user input command was physically generated at the remote computer.

10. The method of claim 9, wherein transmitting the video output of the remote computer to the local computer comprises transmitting the video output of the remote computer to the local computer in a format displayable within a web browser application, and wherein displaying the video output of the remote computer at the local computer comprises displaying the video output of the remote computer at the local computer within a web browser application.

11. The method of claim 9, wherein the remote computer and the local computer are physically located at two different locations and wherein the remote computer and the local computer are connected via a communications network.

12. The method of claim 9, wherein the computer program executing on the remote computer comprises an operating system program.

13. The method of claim 9, wherein the computer program executing on the remote computer comprises a basic input/output system program.

14. The method of claim 9, wherein the computer program executing on the remote computer comprises an application program.

15. The method of claim 9, wherein the computer program executed by the remote computer is operative to access data stored on a storage volume provided by a server computer, the server computer connected to the remote computer via the network, and wherein the method further comprises transmitting, by the local computer to the remote computer, a further user input command generated by the automated testing program executing on the local computer, the further user input command controlling aspects of the computer program executed by the remote computer for accessing the data stored on the storage volume provided by the server computer.

16. Computer storage media having computer-executable instructions stored thereon which, when executed by a first computer, cause the first computer to:

execute a computer program to be tested;

transmit, via a connection between the first computer and a network, video output of the first computer to a second computer, the video output associated with the computer program;

receive, from the second computer via the connection between the first computer and the network, a user input command generated by an automated testing program executing on the second computer and directed toward the video output of the first computer transmitted to the second computer, wherein the user input command tests an interaction between the computer program executed by the first computer and a third computer connected to the first computer via the network; and execute the user input command received from the second computer as if the user input command was physically generated at the first computer to test the interaction between the first computer and the third computer.

17. The computer storage media of claim 16, wherein the video output of the first computer includes a screen display generated by the computer program and wherein the user input command generated by the automated testing program is directed toward the screen display.

18. The computer storage media of claim 16, wherein the first computer and the second computer are physically located at two different locations and wherein the first computer and the second computer are connected via the network.

19. The computer storage media of claim 16, wherein the computer program executing on the first computer comprises an operating system program.

20. The computer storage media of claim 16, wherein the third computer is operative to provide a storage volume and wherein the computer program is operative to access data stored in the storage volume.

\* \* \* \* \*